United States Patent [19]

Willetts

[11] 4,191,398
[45] Mar. 4, 1980

[54] VEHICLE SUSPENSION SYSTEM

[76] Inventor: Elwood H. Willetts, 102 S. Penataquit Ave., Bay Shore, N.Y. 11706

[21] Appl. No.: 846,374

[22] Filed: Oct. 28, 1977

Related U.S. Application Data

[63] Continuation-in-part of Ser. No. 706,730, Jul. 19, 1976, Pat. No. 4,030,738, and Ser. No. 807,002, Jun. 16, 1977, Pat. No. 4,132,433.

[51] Int. Cl.$^2$ .............................................. B60G 5/00
[52] U.S. Cl. .................................... 280/683; 280/687; 267/35
[58] Field of Search .................. 267/35; 280/676, 682, 280/683, 687

[56] References Cited

U.S. PATENT DOCUMENTS

| 2,724,588 | 11/1955 | Sheets ..................................... 267/35 |
| 3,572,745 | 3/1971 | Willetts ................................. 280/687 |

FOREIGN PATENT DOCUMENTS

| 662450 | 4/1963 | Canada .................................... 280/683 |
| 1124832 | 3/1962 | Fed. Rep. of Germany ............. 267/35 |

*Primary Examiner*—Philip Goodman
*Attorney, Agent, or Firm*—Paul J. Sutton

[57] ABSTRACT

The present invention discloses a multiple axle articulated suspension structure and system for vehicles wherein road and tire excitations of each axle are isolated from their opposing axle, as well as from the sprung mass. This is accomplished in a preferred embodiment of my invention via deflections in a combination integrally damped multiple spring means system including a pressure resistant air spring and a self-damping compressive resistant elastomer having high hysteresis characteristics, operatively providing a progressively increasing spring rate. The elastomer is disposed entirely within and functions in parallel with the air spring, such that the compressive resistance of the air spring supplements or augments that of the elastomer, and the high hysteresis of the elastomer serves to dampen fluctuations or deflective excitations induced in the air spring during what as known as jounce conditions.

1 Claim, 2 Drawing Figures

VEHICLE SUSPENSION SYSTEM

This is a continuation-in-part patent application of my pending applications Ser. Nos. 706,730 filed July 19, 1976, entitled TANDEM AXLE VEHICLE SUSPENSION SYSTEM, and 807,002 filed June 16, 1977, now Pat. No. 4,132,433 entitled MULTIPLE AXLE SUSPENSION SYSTEM. Application Ser. No. 706,730 has now issued into U.S. Pat. No. 4,030,738.

This invention relates generally to suspension structures for use with multiple axle vehicles, and more specifically this invention relates to a composite, elastomerically damped suspension structure for tandem or multiple axles, and which exhibits a progressively increasing spring rate under and when subject to increasing loads.

The subject matter of my U.S. Pat. No. 3,856,325, granted on Dec. 24, 1974, is incorporated by reference within this specification. In addition, my U.S. Pat. No. 3,572,745, granted on Mar. 30, 1971, is to be incorporated by reference within this application, the latter being a continuation-in-part of application Ser. No. 721,558, filed Apr. 1, 1968, now abandoned, and application Ser. No. 649,502 filed June 28, 1967, now abandoned.

This patent application incorporates a number of different novel structural vehical suspension arrangements wherein combined spring means of various forms will be described. For example, arrangements wherein an elastomer is physically disposed entirely within an air spring will be described. Other arrangements include the provision of a tubular elastomer which surrounds the combined air spring and elastomer therewithin, this tubular elastomer is stressed in tension. Yet further arrangements will be described wherein rebound elastomeric means are provided both for arrangements wherein the compressive resistance elastomer is within the air spring, and disposed beneath and outside of the air spring.

One of the objects of the present invention, quite apart from the specific objects listed below which only partially define the objectives of the embodiments described herein, is to provide a degree of damping of the excitations of an air spring within a multiple axle vehicle suspension system or structure. These excitations may exceed the tensive shear strength of a bonded elastomer disposed in parallel with respect to said air spring. Another object is to provide a desired degree of damping of an air spring disposed in parallel with respect to a compressive resistant elastomer, wherein the ratio of resistance of the elastomer is sufficiently high such that instantaneous dynamic excitations are dampened, either integrally or remotely. In cases where the air spring damping of forced vibrations is either above or below the level of hysteresis of an elastomeric member disposed within the confines of the air spring, the damping elastomer may be disposed remotely of the air spring, as will be described in more detail for FIGS. 3-5, for example. In addition, one may dampen the hysteresis of an elastomer, or preload negatively, by means of a force opposite to the load deflection force, such as a main force to resist load deflection, plus, a tensile force to maintain a light line during jounce or rebound conditions.

The multiple spring means provided according to the present invention, may comprise the combination in parallel of an air spring and an elastomer, both compressive resistant, with the elastomer hysteresis such that dampening of instantaneous dynamic deflections induced during jounce conditions is accomplished.

It is an object here to apply the hysteresis of an elastomer to dampen these instantaneous dynamic excitations of spring means, whereby the spring means may comprise an air spring and an elastomer, both of which are compressive resistant.

It is worth noting here that the application of air springs to vehicle suspension systems has thus far been restricted to their use with hydraulic shock absorbers, which serve to dampen the excitations of the air supported spring means. The combined weight and cost of the air spring and the shock absorber have somewhat restricted their use to rather fragile cargo transport conditions and applications. It has not been practically feasible to locate the hydraulic shock absorber within the air spring because of the heat of compression generated within the hydraulic shock. This heat generation requires a sufficient flow of free air to cool it, while a radially surrounding air spring would counteract this free flow and would prevent the necessary cooling of the shock, while at the same time overheating the air spring itself.

Tests of elastomers at the operational amplitudes of deflection (restricted by their location in the suspension system) show no measurable heat generation above ambient temperature conditions in the elastomer, while the air temperature rise within the load bearing air spring is less than ten degrees above the same ambient temperature conditions.

As applied to commercial transport vehicle suspension systems, the air spring is pressurized by means of excess capacity of vehicle brake compressors, with air pressures of 100 psi maximum. The polyurethane elastomer has shown long life at 600 psi of area, but travel must be restricted and pressure must be increased on the elastomer to avoid heat buildup from its high hysteresis. I specifically refer to this high hysteresis as those characteristics which are utilized to dampen the air spring as well as the elastomeric deflection characteristics themselves. Thus, remote disposition of the elastomer, as opposed to location within the confines of the air spring itself, may be required to accommodate the travel of the air spring and the deflection ratio of the elastomer in certain conditions.

It is another object of the present invention to dampen the instantaneous dynamic excitations induced by jounce conditions in compressive resistant spring systems. This dampening is accomplished via the hysteresis characteristics of an elastomeric member. In such systems, the spring means may comprise (1) an air spring; or (2) an air spring operatively disposed in parallel with respect to a compressive resistant elastomer of high hysteresis, where the elastomer may either be disposed entirely within this air spring or independently of the air spring; or (3) an air spring in parallel with a compressive resistant elastomer, and a remotely disposed tension resistant elastomer of relatively high hysteresis characteristics, oppositely resistant to the air spring and the first elastomer whereby the air spring and elastomeric member operate in parallel with respect to one another; or (4) an elastomer of sufficiently high compressive resistance in relation to the air spring such that its volume alone in a high hysteresis material will compressively dampen the air spring, and where (a) the elastomer may be bonded axially at its ends to spring seats to afford tensile forces during jounce to dampen the air spring or (b) the elastomer may be bonded axially at its ends to respective opposite ends of the air spring to afford tensive forces during jounce to dampen the air spring; or (5) an air spring may be damped by a tensively stressed elastomeric tubular member radially surrounding the air spring and opposingly compressive resistance of both an air spring and an elastomeric member operating in parallel with respect to one another, this combination having to be increased in load deflection resistance by the tensive or tensile forces of the independently disposed tubular damping elastomer; or (6) an air spring may be damped by a compressive resistant elastomer of high hysteresis disposed on an equalizing lever trunnioned between the air spring and the damping elastomer; or (7) a spring system which may be disposed reactively in a suspension structure integral with the spring system.

Rather than pursue the various combinations contemplated by the present invention, as I am doing here, I will proceed with the specification in describing the specific embodiments disclosed hereby.

A suspension system contemplated by one embodiment of this invention includes a vehicle frame which is supported by a bracket depending downwardly from the frame. The bracket is supported by a pair of rocker beams having horizontal and vertical components. The horizontal components of the rocker beam are, in turn, supported by a pair of laterally extending vehicle axles by any suitable means.

In the present invention, an air spring is employed to which air is supplied at varying pressures depending upon the load on the suspension. A relatively simple height gauge located between the axle and frame senses and controls the pressure. An elastomer actually physically located completely within the air spring both provides complementary load deflection resistance to the air spring and dampens the air spring. A combination integrally damped multiple spring means system includes such a pressure resistant air spring and a self-damping compressive resistant elastomer having high hysteresis characteristics, operatively providing a progressively increasing spring rate. The compressive resistance of the air spring functions in parallel with and supplements or augments that of the elastomer, and the high hysteresis of the elastomer serves to dampen fluctuations or deflective excitations induced in the air spring during what is known as jounce conditions.

The present invention that will be described within this specification and accompanying drawings applies particularly to a suspension system for a short wheel base bogie of a truck-tractor and for trailers, rather than the so-called wide spreads or extended wheel bases or special length vehicles. As now used, air suspensions on conventional vehicles comprise a short beam hinged below the vehicle frame and supported by a cross axle, with an air spring disposed outwardly of the axle between the top of the beam and the underside of the frame. The support beam simply does not afford sufficient transverse verticle freedom to the axle, as is obtained with other suspensions, nor is there proper load equalization between the axles.

Air springs have not been used on truck-tractors and trailers having separately trunnioned and oppositely disposed rocker beams restrained against load deflection by a compressive spring means disposed between the vertically extending components of the rocker beams. This has been due to the fact that designers have not found adequate space for the air spring system.

Furthermore, the interconnecting prop shaft of a tractor extends longitudinally within the frame, which precludes the arrangement taught by U.S. Pat. No. 3,003,781 for trailers, granted to Black.

With the loaded height of a tractor frame restricted to 38 inches, in order to enable fifth wheel engagement with the trailer, this space in a 50 inch wheel base bogie, with sufficient articulation clearance of the tires, enables but a 9-inch diameter air spring with a 3600 pound capacity. In order to clear the fifth wheel, the 9-inch air spring may be disposed or located approximately 20.5 inches over the trunnion assembly which, in turn, is 21 inches from the axle. In such an arrangement, the air spring will supply but 49 percent of the 7200 pound unsprung wheel load (FIG. 5).

According to one aspect of the present invention, a novel arrangement of a combination air/elastomer spring means over and between the tires of adjacent axles will provide deflection reaction on both axles, while enabling the isolation of excitations of each axle from the sprung mass and from the opposing axle, thus preventing resonance and resultant wheel hop.

A comparison of some 37 tractor suspensions shows that the average price and weight of 25 leaf-type spring suspensions is approximately $554 and 1,018 lbs. The price and weight for 12 air spring suspensions averages $513 more and 88 lbs. more than for a leaf spring suspension. Yet, air suspensions that are currently in use simply lack equalization of load between the axles and further lack equalization of the load between opposite ends of an axle until the increased load torsionally deflects the support beam, or a track bar is installed transversely for each axle.

The present invention overcomes disadvantages and drawbacks of prior art attempts to solve the afore-said problems by providing a basic suspension system or structure to which a number of different spring means may be applied.

A spring means arrangement includes a combined integrally damped elastomer air spring supported arrangement wherein the air spring and the elastomer are disposed in parallel with respect to one another and wherein the compressive forces of the air spring and the elastomer are reactive on both axles. This embodiment of the invention is not only beneficial where restricted control of frame deflection is required throughout the load range of the suspension, but does away with the need for the additional vertical space required for the arrangement shown in FIG. 1 of my application Ser. No. 807,002 filed June 16, 1977. The parallel arrangement of the air spring and elastomer affords the required spring force within the space limitations available in a short wheel base suspension. In this arrangement, the hysteresis of the elastomer serves to dampen the fluctuations or excitations induced within the elastomer. The air spring affords control of the frame height through air pressure which is varied, depending upon the load on the suspension. A gauge located between the axle and frame controls air pressure to the air spring.

It is an object of the present invention to provide a suspension system of the novel type just described above.

Another object of the present invention is to provide a suspension system wherein the deflection restraint of a partial capacity air spring is supplemented with either a partial capacity elastomer, or another air spring, or a compressive steel spring, arranged in parallel and reactive on both axles.

A still further object is to provide a suspension structure employing an integrally damped multiple spring means comprising an air spring and at least one self-damping elastomer completely enclosed within the air spring, wherein vertical freedom at opposite ends of each axle is realized throughout the load range, as with all leafspring suspensions known to the art.

Yet another object of this invention is to provide reactive spring means which serves to isolate the sprung mass from the excitations of each axle, as well as from the opposing axle.

Still a further object is to provide a multiple spring arrangement wherein axial alignment of the spring elements is preserved, while reducing the cost, weight and complexity of the tandem axle vehicle suspension while all the time improving the performance characteristics of the suspension system over what is commonly realized in presently known air suspensions.

The invention will be more clearly understood from the following description of specific embodiments of the invention, together with the accompanying drawings, wherein similar reference characters denote similar elements throughout the several views, and in which.

Before referring in detail to various drawings listed above, it is worthwhile here to emphasize that one of the advantages of the suspension structure system disclosed herein includes an economy of both cost and weight. These benefits are realized by any and all the above-referenced spring means combinations. In addition, the spring forces on each transverse side of the suspension structure in the illustrations to be described, are reactive on both axles of the vehicle suspension system, thereby enabling the use of but two, rather than four, air springs. Conventional designs usually require four air springs which add to the weight and cost. Additional benefits reside in the resilient equalization of the load between the opposing axles.

Figure 1:
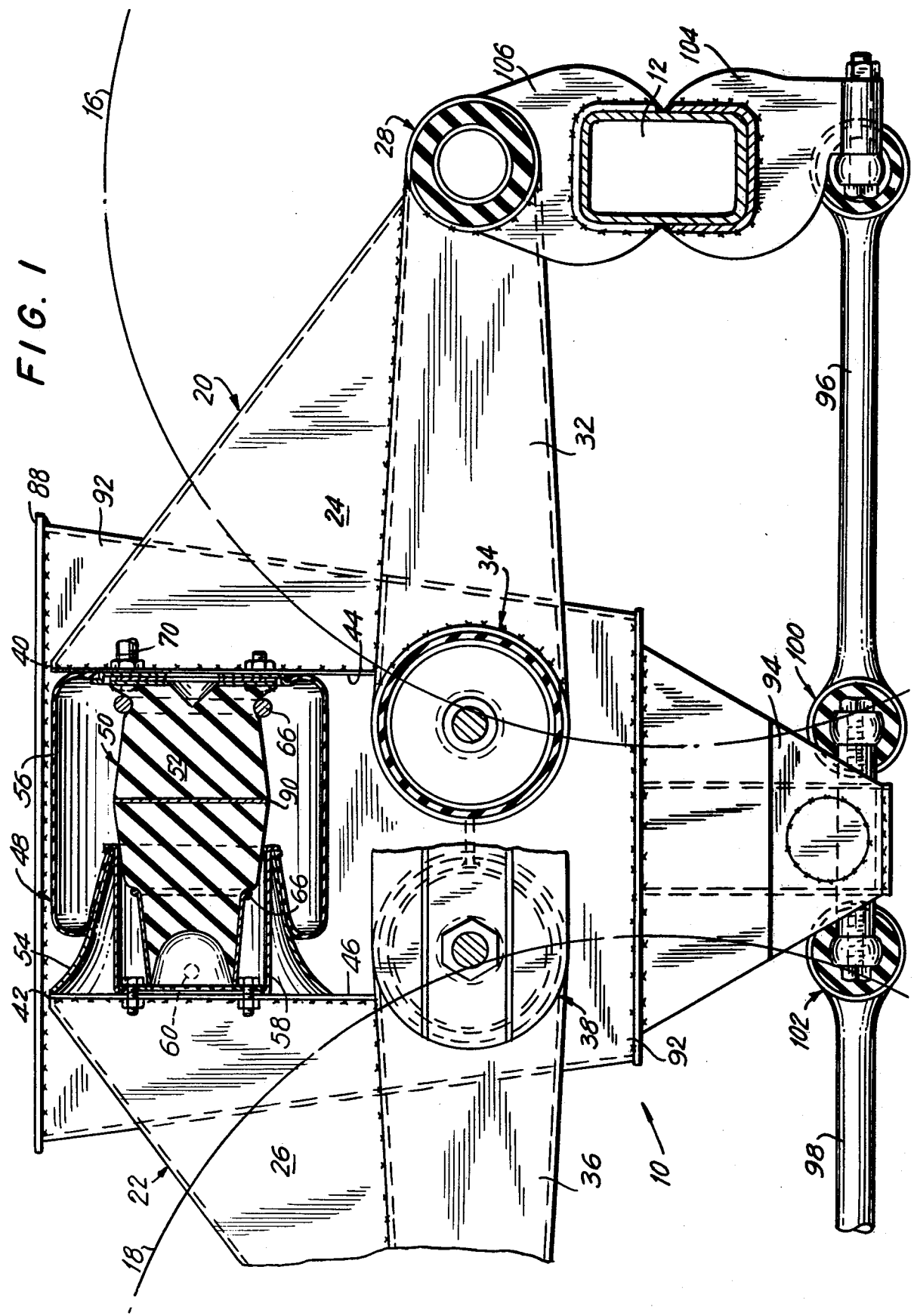
FIG. 1 is a fragmentary sectional elevational view of a preferred embodiment of the present invention, as particularly applied to a tandem axle suspension system wherein a pressure resistant damping elastomer is disposed entirely within an air spring.

Referring now in more detail to the specific drawings provided with this application, FIG. 1 illustrates in a sectional elevational-type view, a combination of elastomeric and air-spring means is illustrated in a configuration wherein the pressure resistant air spring and a self-damping compressive resistant elastomer having high hysteresis characteristics operatively provide a progressively increasing spring rate. A suspension system 10 includes a pair of axles 12 and 14, respectively, which are spaced longitudinally along the axis of the vehicle with supporting wheels 16 and 18 shown in phantom outline. By my use of the word "wheel" in describing wheels 16 and 18, the reader should keep in mind that this use of the phrase refers to the outside diameter of 10.00-20 tires in each case, as reflected by the phantom outline.

Suspension system 10 consists of an over-all structure which includes rocker beam assemblies 20 and 22, each possessing beams 24 and 26, respectively. Beams 24 and 26 are trunnioned in bushing assemblies 28 and 30, respectively, each of these bushing assemblies being carried by hanger brackets of types illustrated in previous of my patents and referred to as axle hanger brackets (not shown with a reference character in these drawings). While the heart of the present invention does not reside in the specific makeup and structure of bushing assemblies 28 and 30 of the present invention, it should be noted that these bushing assemblies are deflectable radially, torsionally and axially.

Referring now to the makeup of the structure of rocker beam assemblies 20 and 22, it can be seen in FIG. 1 that a horizontal component rocker beam member 32 interconnects by a welded attachment bushing assembly 28 and a trunnion assembly 34. Similarly, a horizontal component rocker beam member 36 interconnects bushing assembly 30 with a trunnion assembly 38. It can be seen from FIG. 1 that bushing assemblies 28 and 30, as well as trunnion assemblies 34 and 38, lie along a common center line which extends substantially horizontally of suspension system 10.

Rocker beam assemblies 20 and 22, in addition to the horizontal component members 32 and 36, further include vertically extending or upstanding beams 24 and 26 which extend from members 32 and 36, respectively, to upper ends 40 and 42 thereof, respectively. Beams 24 and 26 include vertically extending and oppositely extending or opposed faces 44 and 46, respectively. Faces 44 and 46 extend upwardly from inclined portions of beams 24 and 26 to upper ends 40 and 42 of these same beams.

Figure 2:
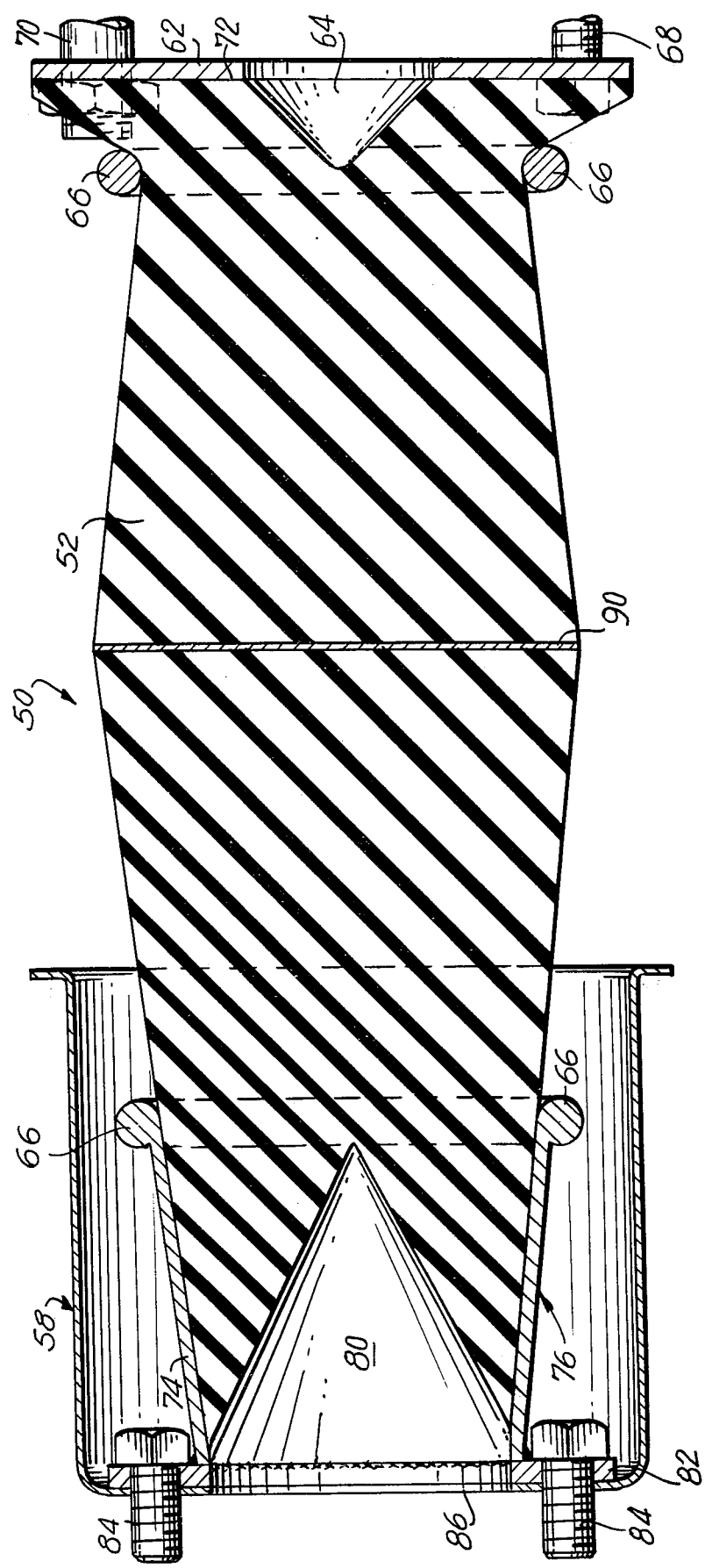
FIG. 2 is an enlarged sectional detail of the elastomeric member illustrated in FIG. 1.

In a preferred embodiment of the present invention of the design shown in FIGS. 1 and 2, all of the structural elements that have been described so far are preferably welded together, using continuous welds which exhibit the full strength characteristics of the metals, in this case SAE 950 steel.

Referring now to the "spring means" utilized within suspension system 10, we see in FIGS. 1 and 2 an air spring assembly 48 disposed between the opposing faces 44 and 46 of rocker beam assemblies 20 and 22. The presence of air spring assembly 48 serves, among other things, to operationally equalize the load as between axles 12 and 14, with an elastomeric assembly 50 serving both to dampen the excitations induced in air spring assembly 48 and to supplement the compressive resistant forces of the air spring.

Elastomeric assembly 50 is physically disposed entirely within and functions in parallel with air spring assembly 48, such that the compressive resistance of the air spring augments that of the elastomer, and the high relative hysteresis of the elastomer serves to dampen deflections or excitations induced in the air spring during what is known as jounce conditions. The elastomeric assembly 50 includes an elastomer or elastomeric member 52 having a predetermined and selected cross-sectional configuration described in more detail below and specifically shown in an elarged sectional view in FIG. 2. The present invention contemplates utilizing an elastomer 52 having the configuration shown in either FIG. 1 or FIG. 2, without departing from the spirit or scope of this invention.

Air spring assembly 48 is preferably of a 10 inch diameter and in a preferred embodiment of this invention is a 5300 capacity, and at design conditions is of a length of 11-½ inches. Air spring assembly 48 consists of an inner member 54 about which an outer member 56 rolls, with a solid core member 58 of the shape shown in FIG. 1 lying substantially coaxially therewithin. A vent hole 60 provides the means by which air is able to enter or escape from the confines of the cavity in the bonded elastomer 52.

As also and perhaps better seen in FIG. 2, elastomeric member 52 is located or disposed entirely within the confines of air spring assembly 48. In the embodiment shown in FIG. 1, elastomeric member 52 comprises part of a bonded assembly 50 wherein a bond exists at each of its longitudinal extremities or ends such that the embodiment of the invention shown in FIG. 1 may be referred to as a bonded elastomeric configuration. In FIG. 2, a substantially flat plate 62 is shown on the rightmost end of this figure and is illustrated as including a center hole to enable molding a cavity in the compressive resistant elastomer at bond plate 62, which bond area will thus equal the bond area at opposite end of said elastomer where it is bond cast within a conical section 74-76, whereat cavity 80 provides the same cross-sectional area of elastomer within the retaining rings 78—as obtains at rightmost (opposite) end.

A plurality of bolts or other suitable conventional fastening means, represented by reference character 68, hold plate 62 to the face 44 of rocker beam assembly 20. A suitable air conduit 70 with appropriate fittings interconnects the confines of outer sleeve member 56 with a remote air tank (not shown). It is the substantially planar or flat end surfaces 72 that are bonded or bondedly connected to plate 62 at the rightmost end of elastomer 52.

On the opposite or left side of elastomeric assembly 50, it is seen in FIGS. 1 and 2 that elastomeric member 52 extends into a conical opening defined by the walls 74 of an insert assembly 76. It should be noted here that a bond exists between the converging conical outer surfaces of elastomeric member 52 at its left end and the inner conical surfaces defined by walls 74. Insert assembly 76 terminates on its left end in a flange 82, which accomodates bolts 84 extending through holes in flange 82 and thereafter through the leftmost end surfaces 86 of core member 58, and thereafter through and into engagement with face 46 of rocker beam assembly 22.

Of course, the specific shape of cavity 80 need not be conical in cross-section, to avoid initiating fractures or a failure line within elastomer 52, and may be rounded as best seen in FIG. 1. It should also be noted that the combined air spring assembly 48 and elastomer assembly 50 are disposed at as comprised spring means below the elevation of the vehicle frame 88, but also disposed vertically above and over trunnion assemblies 34 and 38, previously described.

I wish to note here that it is contemplated with the present invention that an air valve of the type conventionally used with air springs may be used to meter air pressure in proportion to spring load. This has previously been described for my copending application, of which this application is a continuation-in-part. I also wish to note here that the present invention contemplates the utilization of an intermediate metallic plate 90 located midway along the length of elastomeric member 52. This will serve to maintain the alignment and the reliability of member 52 during use. Also, while reference above has been made to frame 88, it is to be emphasized that this same reference character is to be used to connote the elevation of the bottom of the slider base in the case of a trailer suspension, for example.

Referring once agian to FIG. 1 of the drawings, a pedestal 92 is shown extending vertically downwardly from the aforesaid elevation of the slider base bottom. Pedestal 92 is preferably 6 inches deep and provides the means of support for trunnion assemblies 34 and 38, respectively.

Beneath the elevation of pedestal 92 and extending downwardly therefrom is a torque pillar 94 to which torque rods 96 and 98 are resiliently connected at joint assemblies at 100 and 102, respectively. Hanger brackets 104 interconnect the axle housing associated with axles 12 and 14 and the opposite ends of torque rods 96 and 98. Similarly, brackets 106 interconnect these axle housings with bushing assemblies 28 and 30, respectively, each of which is disposed at elevations above the elevation of the vehicle axles. In a preferred embodiment of this invention, the design elevation of axles 12 and 14 with respect to ground is approximately 19.6 inches.

In operation, suspension system 10 previously described for FIGS. 1 and 2, operates as having integrally damped multiple spring means comprising the air spring and at least one self-damping elastomer completely enclosed within the air spring. FIG. 1 specifically is directed by way of example to a tandem axle suspension for trailers, wherein the pressure resistant damping elastomer 52 disposed within air spring assemble 48 and bondedly connected as described above, serves to equalize the load as between axles 12 and 14. It should be once again emphasized that the presence of steel ring 66 and its counterpart 66 at insert assembly 76 provide means for controlling the deflection uniformly at the contrasting bond areas of elastomer 52 at points located at the extremities of the effective length of elastomer 52 which, in the case of the present invention, is preferably 6-¾ inches. In effect, these metallic rings or their counterparts may be located to define the desired effective length of elastomer 52 and, in this way, the hysteresis of the elastomer is used to effectively retard the substantial instantaneous dynamic rebound of air spring assembly 48.

I wish here to reemphasize the importance of the present invention in that the damping of the air spring may be accomplished either integrally or remotely. Where the air spring dampening of forced vibrations is either above or below the hysteresis characteristics of the elastomeric member 52 disposed within the confines of air spring assembly 48, for example, the dampening elastomer may optionally be disposed remotely of the air spring.

The reader's attention is now directed to FIG. 3 of the drawings, wherein another preferred form of the invention as applied to a tandem axle trailer suspension system is shown. In FIG. 3, the author of this application has utilized similar or identical reference characters where appropriate to define elements or components of the present invention which are common to suspension system 10, already described above in FIGS. 1 and 2.

A suspension system 110 is shown in FIG. 3 as consisting of an overall structure which includes a pair of axles 12 and 14, respectively, which are spaced longitudinally along the axis of the vehicle with supporting wheels 16 and 18 shown in phantom outline. System 110 further includes rocker beam assemblies 112 and 114, each possessing vertically extending beams 116 and 118, respectively. Beams 116 and 118 are respectively trunnioned in bushing assemblies 120 (and 122, not shown in FIG. 3), each of these bushing assemblies being supported by or carrying brackerts 124. While the heart of the present invention does not reside in the specific makeup and structure of bushing assemblies 120 and 122, it is once again worth mentioning that these bushing assemblies are deflectable radially, torsionally and axially.

Reference to FIG. 3 will show that a horizontal component rocker beam member 126 interconnects by welded collars the bushing assembly 120 and a trunnion assembly 128. Similarly, a horizontal component rocker beam member 130 interconnects bushing assembly 122 with a trunnion assembly 132. These bushing and trunnion assemblies associated with suspension system 110 lie along a common centerline which extends substantially horizontally of the structure.

Vertically extending beams 116 and 118 include oppositely extending or opposed faces 134 and 136. Between faces 134 and 136 lies a combined spring means including an air spring assembly 138 and an associated elastomeric assembly 140 disposed completely within air spring assembly 138.

Air spring assembly 138 includes an inner member 142, and an associated rolling sleeve-type outer member 144 of the type described for system 10 above. Similarly, a core member 146 is located adjacent face 136 of rocker beam assembly 114.

Elastomeric assembly 140 comprises a centrally located elastomer 148 held in position by pilot members 150 which extend toward one another from oppositely facing and inwardly directed flanged pedestals 152 and 154. As best seen in FIG. 4, vent holes 156 provide means by which air pressure is effective on the area of pedestals 152 and 154.

It is very important here to emphasize the fact that elastomer 148 is not bondedly connected to pedestals 152 and 154, but yet functions in parallel relationship with respect to the air spring assembly 138. This enables the air spring to more instantaneously move axially away from the elastomer during rebounds or a jounce condition, but at the same time suggests the need for a second compression resistant elastomer 158 of relatively high hysteresis characteristics and disposed beneath the elevation of trunnion assemblies 128 and 132. Compression resistant elastomer 158 is captively held by means of pilot member 160 which extend inwardly from depending and inwardly curved rocker arms 162 and 164, each of which comprises an integral part of horizontal rocker beam components 126 and 130, respectively. Again, the significance of the presence of elastomer 158 is to augment or increase the load on the air spring assembly 138 to prevent its more instantaneous retreat from the less sensitive elastomer 148 during conditions of rebound or jounce.

We thus see that the present invention provides optional means of applying the hysteresis characteristics of an elastomeric member, in compression, to dampen the excitations of an air spring, or of an elastomer disposed in parallel with respect to the air spring, by providing the disposition of the damping elastomer beyond or below a trunnion point about which the compressive resistant spring elements are located. The dampening elastomer will be compressed in opposition to the compressive resistance of the principal spring means—the air spring, for example—which must then be increased in force by the resistance of the damping elastomer to resist a given load deflection force.

FIG. 4 represents a rather enlarged view of the combined spring means consisting of air spring assembly 138 and elastomeric assembly 140, and serves to show in a bit more detail the structural arrangement of the components of this combined spring means described above. As in the case of the combined spring means 48 and 50 described above for suspension system 10, the combined air spring assembly 138 and elastomeric assembly 140 are physically connected to opposing faces 134 and 136 of the rocker beam assemblies by means of bolts 166, shown in FIG. 4.

Yet another feature of vehicle suspension system 110 that is shown in FIGS. 3 and 4 resides in the presence of a substantially tubular elastomer 168, of an elastomeric material of high hysteresis, and which is connected to rocker beam assemblies 112 and 14 by means of conventional fasteners 170. Elastomeric tube 168 is strained in tension, while at the same time the air spring assembly 138 and the elastomeric assembly 140 are compressed to resist load deflection.

The reader's attention is now directed to FIG. 5 wherein a suspension system 180 is shown. In system 180, as applied to the same tandem axle vehicle suspension, the spring means between opposed rocker beam assemblies 182 and 184 comprise an air spring assembly 186, an elastomeric assembly 188 that is disposed independently of and below air spring assembly 186, and which is unbonded axially, together with a second elastomeric assembly 190 that is compressively restrained in opposition to the first elastomeric assembly 188, and which imposes a load on the air spring assembly 186 to prevent a more instantaneous reflection or reaction than would be the case with an unbonded first elastomer during jounce conditions.

As with the case of suspension system 110, shown in FIGS. 3 and 4, identical reference characters have been used throughout the various views of the drawings, including FIG. 5, to represent comparable parts of the present invention.

The arrangement shown in FIG. 5 of the drawings contemplates situations where the operational ratio as between elastomeric assembly 188 and air spring assembly 186 is inadequate to dampen air spring assembly 186. Thus, we present with the arrangement shown in FIG. 5 load resistance by means of air spring assembly 186, load resistance by means of elastomeric assembly 188, and rebound resistance with elastomeric assembly 190.

I do not wish here to repeat in detail the specific structure already described for the previous drawings and incorporated herein at least in part, for the sake of economy. However, as already stated, comparable reference characters utilized in the previous views have been incorporated herein. It should be added that a hanger bracket arrangement 192 supplements or complements what has already been described previously and is representative, per se, of what has previously been described in my copending patent applications.

The present invention has been described in sufficient detail to enable one of ordinary skill in the art to make and use same. Obviously, modifications and alterations of the aforedescribed preferred embodiments of my invention will occur to others upon a reading and understanding of the specification and drawings, and it is my intention to include all such modifications and alterations as part of my invention, insofar as they come within the proper scope and spirit of the invention as defined by the appended claims.

What is claimed is:

1. A multiple axle vehicle suspension structure, comprising, in combination: transversely extending axles spaced from one another longitudinally with respect to the longitudinal axis of said vehicle suspension structure, frame members spaced transversely with respect to one another and extending between said axles, opposing rocker beam assemblies separately trunnioned in said structure at an elevation beneath the elevation of said frame members, said opposing rocker beam assemblies being pivotally supported at longitudinally extending ends thereof by and above the respective elevations of said axles, multiple spring means characterized by the absence of helical springs and being reactive with respect to said axles for operationally equalizing the load as between said axles, said multiple spring means comprising an air spring assembly disposed intermediate and cooperative with upwardly extending faces of said opposing rocker beam assemblies, and at least one elastomer which is operatively resistant to compressive forces produced during use, said compressive resistant elastomer comprising an elastomeric member of high hysteresis characteristics and being operatively self-damping while in parallel relationship with respect to said air spring assembly, operationally providing a combined spring rate with said air spring assembly which increases progressively with load, said compressive resistant elastomer being enclosed within the confines of and during use functioning within the longitudinal space limitations as that of said air spring assembly.

* * * * *